June 2, 1964

A. S. VOLPIN 3,135,285

AUTOMATIC SEALED GATE VALVE

Filed Aug. 24, 1959

Alexander S. Volpin
INVENTOR.

BY

ATTORNEY

June 2, 1964

A. S. VOLPIN 3,135,285

AUTOMATIC SEALED GATE VALVE

Filed Aug. 24, 1959

Alexander S. Volpin
INVENTOR.

BY

ATTORNEY

United States Patent Office 3,135,285
Patented June 2, 1964

3,135,285
AUTOMATIC SEALED GATE VALVE
Alexander S. Volpin, 10200 W. Broadview Drive,
Miami Beach, Fla.
Filed Aug. 24, 1959, Ser. No. 835,557
3 Claims. (Cl. 137—246.12)

This invention relates to automatic sealed gate valves employing a lubricant or other plastic sealant for sealing between the gate and seat elements of the valve. More particularly, the present invention relates to automatic sealed gate valves of the through-conduit type.

In more conventional gate valves of the automatic lubricant-sealed type, sealing is normally effected between the downstream seat and the adjacent gate segment, the gate commonly being constructed of two separate gate segments urged apart by springs. With this construction the upstream pressure will urge the gate into sealing engagement with the downstream seat, at the same time moving the upstream segment of the gate slightly inwardly away from the upstream seat to allow the upstream or line pressure to enter the gate chamber. This pressure is directed to the sealant reservoir and urges sealant into the sealing grooves provided between the downstream seat and the downstream gate segment to thereby effect a leak-proof seal between the gate and the downstream seat.

This more conventional arrangement has the disadvantage that the higher line pressure will be trapped in the gate chamber and its pressure will be exerted on the stem and bonnet seals, creating sources of leakage from the valve body, and resisting movement of the stem in moving the gate.

The present invention has for its principal object the provision of an improved automatic lubricant-sealed gate valve which obviates the several enumerated disadvantages for through-conduit gate valves.

A primary object is the provision of a gate valve in which both the upstream and downstream sides will be automatically sealed in both the open and closed positions.

An important object is the provision of means by which pressure trapped in the gate chamber will be automatically relieved to the lower pressure side of the valve to thereby relieve pressure on the stem and bonnet seals.

Still another object is the provision of an automatic sealing arrangement whereby pressure trapped in the gate chamber in the closed position of the valve may be relieved, permitting the valve stem packing to be replaced while the valve gate is in the closed position under full pressure of the line fluid.

A more specific object is the provision of a gate valve construction employing a one-piece through-conduit gate, together with gate seats reciprocally mounted in the valve body on opposite sides of the gate and responsive to fluid pressure from the higher pressure side of the valve to automatically seal between the gate and seats with plastic sealant.

An additional specific object is the provision in a through-conduit gate valve of reciprocable gate seats adapted to seal with both sides of a one-piece gate and provided with check valve means for automatically relieving the higher line pressure trapped in the gate chamber into the lower pressure flow passage of the valve.

Other and more specific objects and advantages of this invention will become more readily apparent from the following description when read in conjunction with the accompanying drawing which illustrates a valve construction in accordance with the present invention and a modification thereof.

In the drawing:
FIG. 1 is a longitudinal vertical cross-sectional view of a valve in accordance with the present invention, the view being taken generally along line 1—1 of FIG. 3;

FIG. 6 is a vertical cross-sectional view of a fragment of a valve similar to that shown in FIG. 1, having a modified seat and seal construction; and FIG. 7 is a fragmentary view taken generally along line 7—7 of FIG. 6 illustrating additional details of the modified seat and seal construction.

Figures 1, 2:
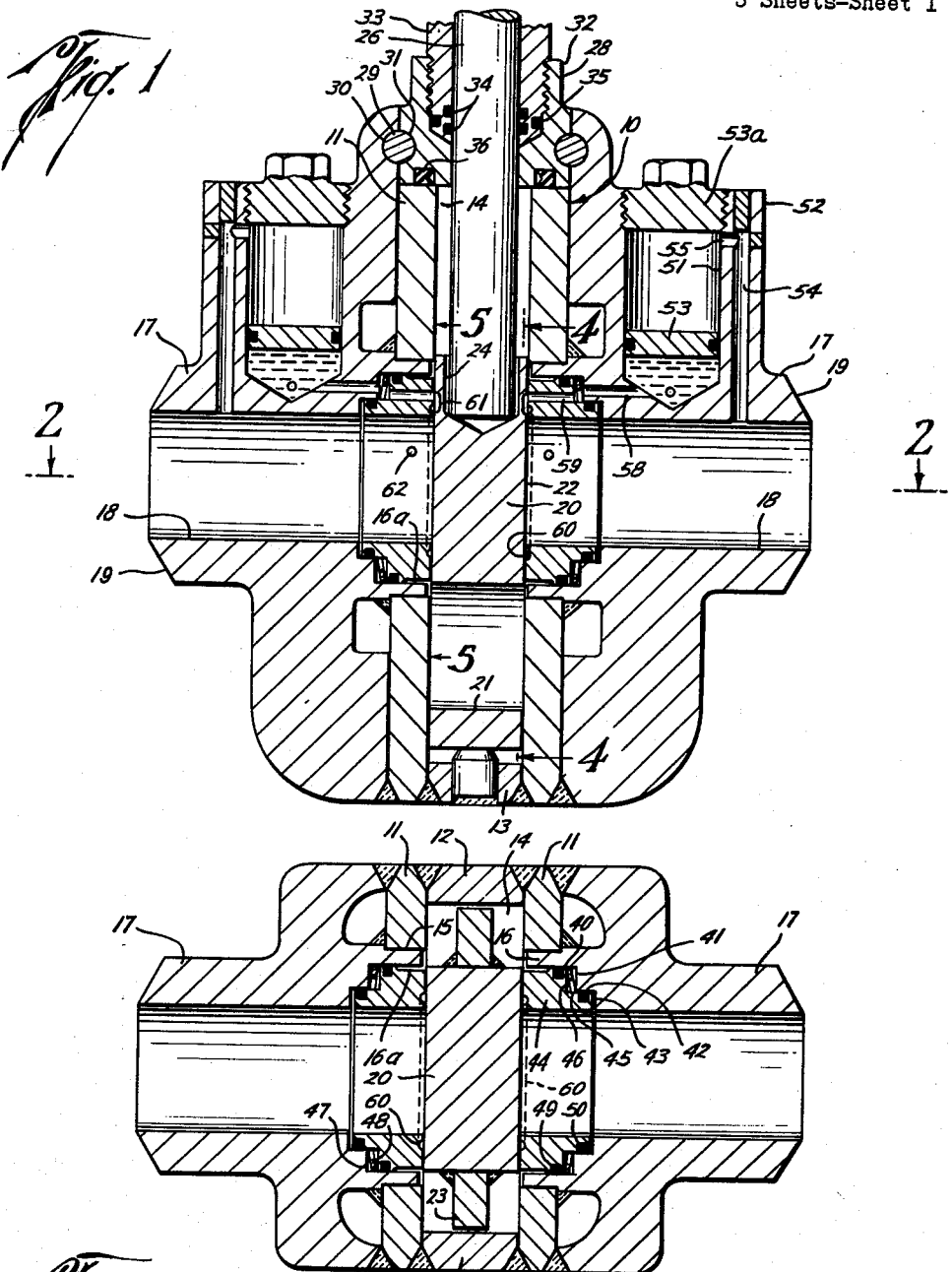
FIG. 2 is a longitudinal horizontal cross-sectional view of the valve taken along line 2—2 of FIG. 1.

Referring to the drawing, there is shown a gate valve body, designated generally by the numeral 10, which is of fabricated construction comprising a pair of parallel spaced-apart end plates 11—11 and connecting side plates 12—12. Bottom closure plate 13 is disposed between the side and end plates at the lower end of the valve body forming the bottom closure for the gate chamber 14, which is defined within the valve body. End plates 11—11 are provided with registering cylindrical openings 15—15 into which extend cylindrical bosses 16—16 formed on the ends of a pair of nozzle sections 17—17 which are rigidly secured to the side plates in a suitable manner as by welding at various points. Nozzle sections 17—17 are provided with registering flow passages 18—18 which communicate with gate chamber 14. The outer ends of the nozzle sections are chamfered at 19 for welding into the pipe line in which the valve is to be inserted, but it will be understood that this type of connection may be replaced with bolt flanges, screw fittings, or any other conventional type of connecting means. Mounted in gate chamber 14 between end walls 11—11 is a one-piece conduit-type gate 20 of generally rectangular configuration having flat substantially parallel side faces. Gate 20 has a through-conduit portion 21 at its lower end and a closure portion 22 in its upper portion. The thickness of gate 20 is such that it will slide freely between the end plates and is provided on its longitudinal edges with oppositely extending guide flanges 23 which are shorter than the gate, being disposed substantially equidistantly from the upper and lower ends of the gate, and which are also thinner than the gate so as to provide a clear space between the flanges and the end plates 11—11. The width of flanges 23 is such that their outer edges will have a free sliding fit with side walls 12—12. At its upper end gate 20 is provided with a cylindrical socket 24, which is adapted to receive the lower end of an operating stem 25 which extends upwardly to the exterior of the valve between the walls of the gate chamber. The diameter of socket 24 is made somewhat greater than the diameter of stem 25 to permit some lateral movement of the gate with respect to the stem. A locking pin 26 is screwed through one edge of the gate to project from the wall of socket 24 into a recess 27 provided in the periphery of the stem, whereby to lock the stem against rotation relative to the gate. The internal diameter of recess 27 is greater than the external diameter of pin 26 to allow the degree of relative lateral movement to accommodate the movement of the gate relative to the stem, without permitting relative rotation therebetween. Gate stem 25 extends through a bonnet 28, which is of generally rectangular configuration, conforming to that of valve body 10 and adapted to be locked in place to close the upper end of the gate chamber by means of a pair of locking bolts 29 which extend on each side of the bonnet in parallel relation and through registering complementary semi-circular grooves 30 and 31 provided, respectively, in portions of the nozzle sections which project above the upper ends of end plates 11 and contiguous portions of bonnet 28. A tubular boss 32 is formed integrally with bonnet 28 at the center thereof, through which stem 25 extends, and a gland nut 33 is screwed into the bore of boss 32 to form a closure about the stem. The inner end of gland nut 33 carries internal and external seals 34 and 35, respectively. The internal seals 35 seal between the gland nut and the exterior of stem 25, while the external seals 35 seal between the gland nut and the bore of boss 32. The seals 34 and 35 may be O-ring type seals, as illustrated, but may also be other types of seals. The lower face of bonnet 28 carries seal packings 36 for sealing between the bonnet and the upper end of body 10.

Each of the bosses 16, carried by the inner ends of nozzle sections 17, is counterbored in two steps to provide the larger diameter counterbore 40, defining the outwardly facing internal shoulder 41, and a smaller diameter counterbore 42 defining the outwardly facing internal shoulder 43 disposed, of course, rearwardly of shoulder 41. Slidably mounted in the counterbore 40 is a seat ring 44, the inner end of which is reduced in diameter to form the cylindrical neck 45, which is slidably receivable in the smaller diameter counterbore 42. The reduction in diameter of the seat ring to form neck 45 provides the inwardly facing annular shoulder 46 opposed to shoulder 41. The length of neck 45 is made somewhat greater than the length of counterbore 42 so that when the outer end of neck 45 is engaged with shoulder 43, a space 47 will be provided between shoulders 41 and 46. A coil spring 48 is mounted around neck 45 and seated in space 47 in compression between shoulders 41 and 46, whereby to normally urge the seat ring 44 outwardly of the counterbores and inwardly of the gate chamber toward the opposed face of gate 20. A slidable seal, such as an O-ring 49, is mounted between the exterior of seat ring 44 and counterbore 40 and a second slidable seal, such as O-ring 50, is mounted about neck 45 between the latter and counterbore 42, these seals providing a slidable fluid-tight seal between the seat ring and boss 16. The external diameter of seat ring 44 outwardly of seal 49 is reduced slightly to provide the annular space 16a between the seat ring and counterbore 40 which communicates with gate chamber 14.

Figure 3:
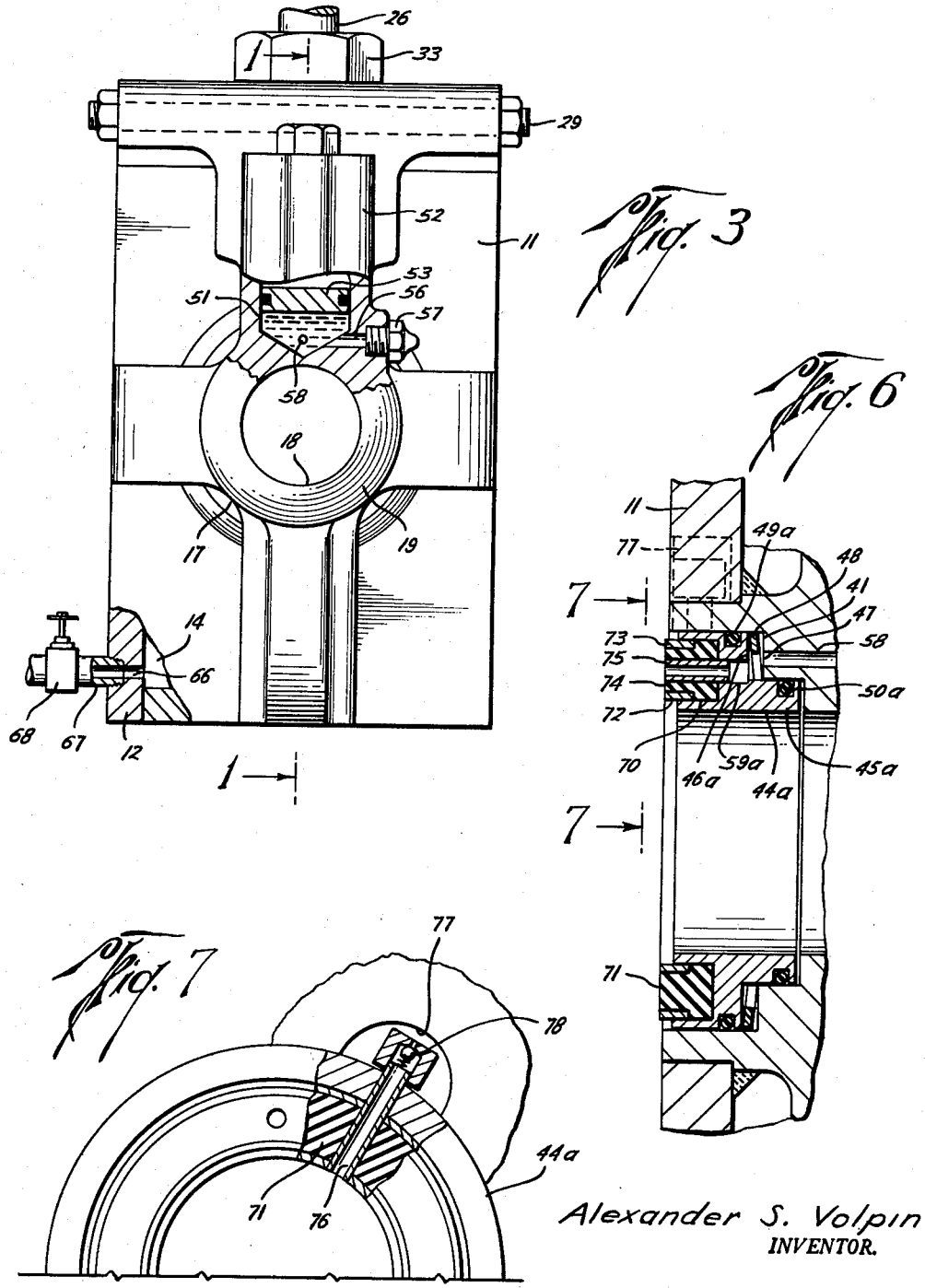
FIG. 3 is an elevational view of one end of the valve, portions thereof being broken away for purposes of illustration.
Figure 4:
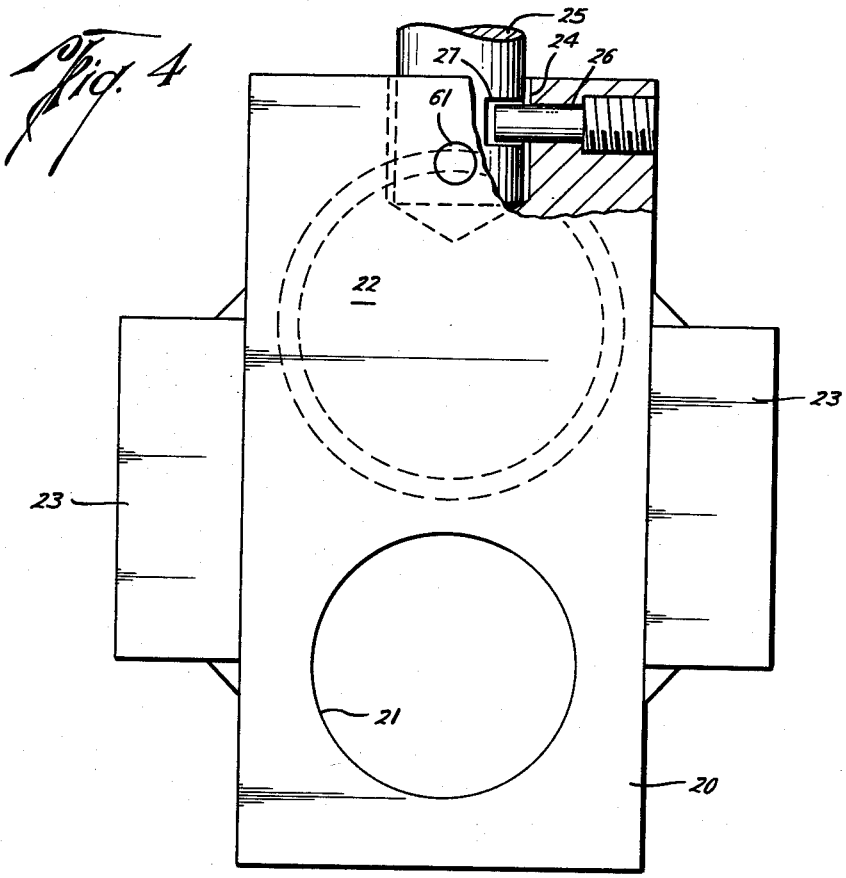
FIG. 4 is a view taken along line 4—4 of FIG. 1, providing an elevational view of one side of the gate member of the valve and having a portion thereof broken away to illustrate some of its details.
Figure 5:
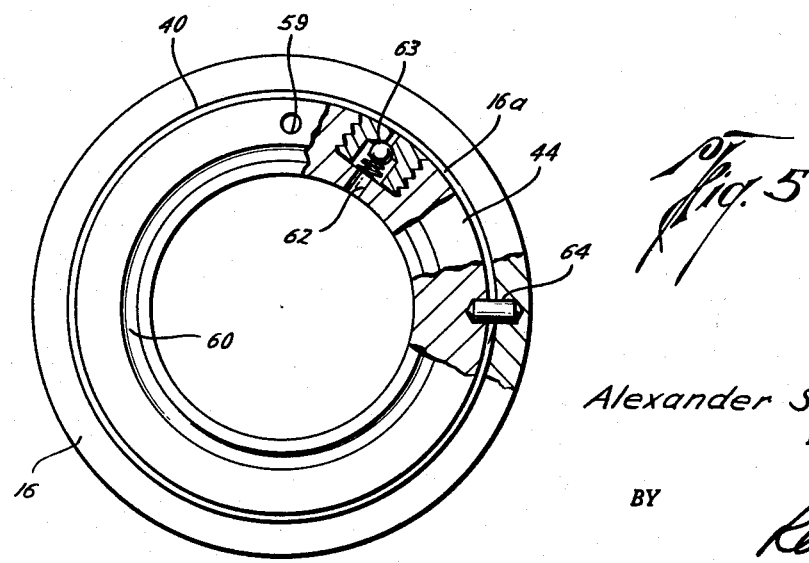
FIG. 5 is a fragmentary view taken along line 5—5 of FIG. 1, showing the inner end of one of the gate seats and having portions thereof broken away to illustrate the pressure relief valve installed in the seat.

The valve is provided with an automatic lubricant sealing system for sealing between the gate and both the inlet and outlet ends of the valve. Each of these systems, which are identical, comprises a sealant reservoir 51 provided in a boss 52 integral with nozzle section 17 and disposed above the flow passage. A threaded closure 53a is provided for the upper end of reservoir 51 and the latter has a piston 53 slidably mounted therein for reciprocating movement in the reservoir. A channel 54 extends upwardly through boss 52 and communicates at its upper end with a port 55 opening into the upper end of reservoir 51. At its lower end channel 54 communicates with flow passage 18. Extending through a side wall of boss 52 (FIG. 3) is a passageway 56 which communicates with the lower end of reservoir 51 below piston 53 and is closed by means of a conventional type of grease or lubricant supply fitting 57, by means of which sealant may be introduced into reservoir 51 below piston 53. An outlet channel 58 communicates at one end with reservoir 51 below the piston 53 and at its other end communicates with the space 47. A sealant feed passage 59 extends longitudinally through seat ring 44 and communicates at its inner end with space 47 and at the other end with the outer end face of the seat ring. An annular groove 60 is formed in the outer end face of the seat ring and is spaced radially inwardly slightly from the point at which passage 59 opens to the seat face, so that groove 60 and passage 59 will normally be out of communication with each other. Each side face of gate 20 is provided with a recess 61 which forms a jumper or communication channel between passage 59 and groove 60 when the gate is in the closed position (FIG. 1), but which will be moved out of connecting relation between passage 59 and groove 60 when the gate moves upwardly a very short distance toward its open position.

Extending radially through the wall of seat ring 44 is a passage 62 which provides communication between the bore of the seat ring and the exterior portion thereof which defines space 16a. A check valve 63, of any conventional construction and adapted to open inwardly, controls passage 62 so as to admit fluid pressure from the gate chamber 14 through space 16a and passage 62 to the bore of seat ring 44 while preventing reverse flow of fluid from the bore of seat ring 44 into the gate chamber. A locking pin 64 extends radially between seat ring 44 and boss 16 to lock the seat ring against rotation in counterbore 40.

The valve construction, as described, will, it is obvious, be completely symmetrical so that either end of the valve may be the inlet and the other the outlet and the operation of the valve will be the same, irrespective of which is the inlet and which is the outlet.

In order to drain fluid under pressure which may be trapped in gate chamber 14, a passage 66 may be provided through one of the side walls 12 (FIG. 3), into which is screwed a nipple 67 fitted with a control valve 68. Opening of the latter will allow fluid or fluid pressure entrapped within a chamber 14 to be discharged through nipple 67, for purposes to be described hereinafter.

Operation of the valve is as follows: The valve will be installed in a conventional manner in a pipe line (not shown) for purposes of controlling fluid flow through the pipe line. It will be understood that an operator of any conventional construction will be connected to the upper end of stem 25 for reciprocating the latter to thereby reciprocate gate 20. Assuming first that the valve is in the open position, that is, with through-conduit portion 21 positioned co-axially with flow passages 18, the pressure of the fluid on the upstream side of the valve will be exerted against the end of the upstream seat ring 44 and in conjunction with pressure of spring 48 will urge the seat ring tightly about the upstream end of portion 21. The pressure thus exerted against the upstream face of the gate will urge the latter bodily toward the downstream seat and the latter, under the pressure of its spring 48, will be urged against the downstream face of the gate so that both gate seats will be in sealing contact with the opposite faces of the gate and fluid will flow through the flow passages from one side of the valve to the other. Any fluid pressure trapped in the gate chamber by the opening movement of the gate will be effectively relieved through the downstream relief passage 62 and its controlling check valve 63, thereby equalizing the pressure between the gate chamber and the downstream side of the valve.

When the valve is moved to the closed position (shown in FIG. 1), the upstream pressure will be exerted through channel 54 and port 55 against the upper end of piston 53 and this pressure being greater than the downstream pressure will urge piston 53 downwardly and thereby force sealant through passages 58 and 59, and thence to jumper 61 into groove 60, forming a plastic seal between the upstream seat and the contiguous portion of the face of closure portion 22 of the valve, thereby effecting automatic sealing on the upstream side. Again, the downstream seat will be urged into contact with the downstream face of closure portion 22 and any line fluid under the line pressure, which will be trapped in gate chamber 14 by the closing of the gate, will automatically discharge through relief passage 62 and check valve 63 in the downstream seat, flowing therefrom into the downstream flow port and again relieving the pressure from the interior of the gate chamber which would otherwise be exerted against bonnet seal 36 and stem seals 34 and 35. This relief of pressure will necessarily reduce the force required to reciprocate the stem and gate.

By provision of drain valve 68, whenever the gate is in the closed position, any fluid pressure trapped in gate chamber 14 may be exhausted through nipple 67 by opening valve 68. Upon relief of this pressure, differential pressures will immediately occur between either or both of the flow passages and the outlets of passages 59 to the gate chamber, depending on whether the pressures in one or both flow passages exceeds that in the vented gate chamber. As a result, either or both pistons 53 will be actuated to force sealant to the related sides of the gate, forming the fluid-tight seals between the gate surface and the gate seats which are subject to higher pressure than in the vented gate chamber. When this occurs and the pressure has been removed from the interior of gate chamber 14, it becomes possible to remove gland nut 33 and repack the stem, if that has become necessary. This is an important advantage, particularly in the operation of through-conduit gates of the very large sizes which are employed to control flow of fluids in pipe lines, because in the absence of this system it would be necessary to shut down the flow of fluid through the pipe line at some other point in order to permit repacking of the valve.

FIGS. 6 and 7 illustrate a modification of the automatic sealing system in that instead of using a lubricant as the primary sealing medium, each of the seat faces may be provided with a rubber or similar plastic seal ring insert and the end surface of the latter, which is engaged with the gate face, may be flooded with a type of lubricant adapted to permit the gate to slide freely over the plastic end face of the insert. Thus, if the insert is made from a form of rubber which will be insoluble in oil, the lubricant, which is fed onto the end face of the insert, may be a material having a high degree of lubricating quality as distinguished from the viscous sealants of the type commonly employed for automatic sealing. Such an arrangement greatly reduces friction between the rubber or plastic insert and the gate faces and correspondingly reduces wear of the inserts.

Referring more specifically to FIGS. 6 and 7, the seat rings 44a have the same general external construction as seat rings 44, in that each has a neck portion 45a and a shoulder 46a corresponding to elements 45 and 46, respectively, of the previously described embodiment. The outer end of seat ring 44a is counterbored to provide the annular socket 70 in which is inserted an annular seal ring 71 constructed of neoprene, Hycar, or similar synthetic rubbers which will not be soluble in hydrocarbons, such as are commonly transmitted through valves of the kind here described. Metal re-enforcing rings 72 and 73 are disposed about the inner and outer peripheries of seal ring 71 adjacent the outer end of the latter. A passageway 74 extends from the outer end of the seal ring through the body thereof into registration with a passage 59a, which corresponds in purpose with passage 59 of the previously described embodiment. A metal re-enforcing sleeve 75 is mounted in passage 74 to support the walls of the passage. Extending radially through the body of seat ring 44a and insert seal 71, is a passage 76 which communicates at its inner end with the bore of seat ring 44a and at its outer end with a recess 77 formed in the inner face of plate 11 and communicating at its inner end with gate chamber 14. The outer end of passage 76 is closed by an inwardly opening check valve 78 which functions in exactly the same manner as check valve 63 in the previously described embodiment.

In operation, this modified sealing system performs exactly in the same manner as the previously described embodiment, the only difference being that the seal formed between the seat ring and the gate face is a plastic material to which a suitable lubricant will be automatically fed from reservoir 51 in the same manner as sealant is fed to the seat faces as in the previously described embodiment. This lubricant, while serving to improve the seal between the plastic insert and the gate face, is primarily intended to help increase the ease by which the gate may slide across the end faces of seals 71.

Moreover, the check valve controlled passage operates in the same manner in this modification as in the previously described modification in relieving trapped pressure from the gate chamber to the lower pressure side of the valve.

It will be understood that numerous changes and modifications may be made in the details of the illustrative embodiment within the scope of the appended claims, but without departing from the spirit of this invention.

What I claim and desire to secure by Letters Patent is:

1. In an automatic lubricant sealed valve, a housing having a closure chamber therein, an operable closure in the chamber having upstream and downstream sealing faces, aligned flow ports opening into said chamber, seat members mounted in the inner ends of said flow ports cooperating with said sealing faces, and an independent lubricant sealing system for each of said sealing faces, each system being provided with a sealant reservoir, a movable barrier therein, passage means to conduct sealant from each said reservoir solely to one of said sealing faces of said closure, conduit means independent of said chamber communicating with the flow port upstream of said closure to admit upstream line pressure directly to the upstream reservoir which is in communication with the upstream sealing face of said closure and operable when the closure is in the flow port-closing position to force sealant from said upstream reservoir through the upstream sealing system solely to the upstream face of said closure in response to a dominant fluid pressure existing in the upstream flow port in relation to the pressure in said closure chamber, said passage means including a full port sealant groove about a flow port between the adjacent faces of a seat member and said closure, and a bridging recess disposed between said faces to establish communication between said groove and said reservoir only when said closure is in the port-closing position.

2. In an automatic lubricant sealed valve, a housing having a closure chamber therein, an operable closure in the chamber having upstream and downstream sealing faces, aligned flow ports opening into said chamber, seat members mounted in the inner ends of said flow ports cooperating with said sealing faces, and an independent lubricant sealing system for each of said sealing faces, each system being provided with a sealant reservoir, a movable barrier therein, passage means to conduct sealant from each said reservoir solely to one of said sealing faces of said closure, conduit means independent of said chamber communicating with the flow port upstream of said closure to admit upstream line pressure directly to the upstream reservoir which is in communication with the upstream sealing face of said closure and operable when the closure is in flow port-closing position to force sealant from said upstream reservoir through the upstream sealing system solely to the upstream face of said closure in response to a dominant fluid pressure existing in the upstream flow port in relation to the pressure in said closure chamber, and means mounted in the downstream seat member responsive to a dominant fluid pressure existing in the closure chamber in relation to the pressure in the downstream flow port to automatically relieve the pressure from the gate chamber into the downstream flow port, said passage means including a full port sealant groove about a flow port between the adjacent faces of a seat member and said closure, and a bridging recess disposed between said faces to establish communication between said groove and said reservoir only when said closure is in the port-closing position.

3. In an automatic lubricant sealed valve, a housing having a closure chamber therein, an operable closure in the chamber having upstream and downstream sealing faces, aligned flow ports opening into said chamber, seat members slidably mounted in the inner ends of said flow ports, means biasing the seat members toward said sealing faces, and an independent lubricant sealing system for each of said sealing faces, each system being provided with a sealant reservoir, a movable barrier therein, passage means to conduct sealant from each said reservoir solely to one of said sealing faces of said closure, conduit means independent of said chamber communicating with the flow port upstream of said closure to admit upstream line pressure directly to the upstream reservoir which is in communication with the upstream sealing face of said closure and operable when the closure is in flow port-closing position to force sealant therefrom through the upstream sealing system solely to the upstream face of said closure in response to a dominant fluid pressure existing in the upstream flow port in relation to the pressure in said closure chamber, said passage means including a full port sealant groove about a flow port between the adjacent faces of a seat member and said closure, and a bridging recess disposed between said faces to establish communication between said groove and said reservoir only when said closure is in the port-closing position.

References Cited in the file of this patent

UNITED STATES PATENTS

| | | |
|---|---|---|
| 1,957,807 | Robinson | May 8, 1934 |
| 2,351,775 | McMurry | June 20, 1944 |
| 2,573,238 | Wunn | Oct. 30, 1951 |
| 2,700,528 | Blackman | Jan. 25, 1955 |
| 2,796,230 | Grove | June 18, 1957 |
| 2,810,543 | Bryant | Oct. 22, 1957 |
| 2,861,771 | Bryant | Nov. 25, 1958 |
| 2,868,221 | Eichenberg | Jan. 13, 1959 |
| 2,869,574 | Volpin | Jan. 20, 1959 |
| 2,890,017 | Shafer | June 9, 1959 |

FOREIGN PATENTS

| | | |
|---|---|---|
| 445,636 | Great Britain | Apr. 16, 1936 |